Figure 1:
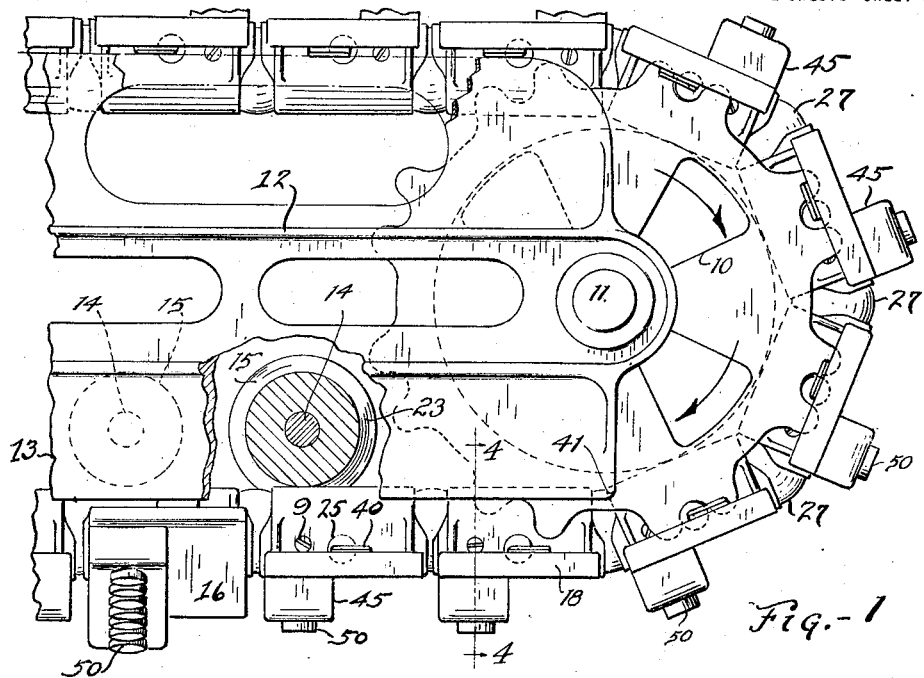

C. T. TORRESEN AND C. G. ROTH.
TRACTOR BELT.
APPLICATION FILED MAR. 17, 1921.

1,437,693.

Patented Dec. 5, 1922.
2 SHEETS—SHEET 1.

INVENTORS,
Carl T. Torresen.
By Charles G. Roth
Baker Macklin, ATTORNEYS

C. T. TORRESEN AND C. G. ROTH.
TRACTOR BELT.
APPLICATION FILED MAR. 17, 1921.

1,437,693.

Patented Dec. 5, 1922.
2 SHEETS—SHEET 2.

INVENTORS,
Carel T. Torresen
Charles G. Roth
BY
Bates & Macklin ATTORNEYS

Patented Dec. 5, 1922.

1,437,693

UNITED STATES PATENT OFFICE.

CAREL T. TORRESEN AND CHARLES G. ROTH, OF CLEVELAND, OHIO.

TRACTOR BELT.

Application filed March 17, 1921. Serial No. 452,915.

*To all whom it may concern:*

Be it known that we, CAREL T. TORRESEN and CHARLES G. ROTH, citizens of the United States, and residents of Cleveland, county of Cuyahoga, and State of Ohio, have invented a certain new and useful Improvement in Tractor Belts, of which the following is a full, clear, and exact description, reference being had to the accompanying drawings.

This invention relates to track-laying vehicles and is primarily concerned with the construction of an endless tread adapted for use in connection with vehicles, such as tractors.

Track-laying vehicles, usually employ an endless tread comprising a series of tread blocks which are hinged together in such manner as will enable them to be moved in a vertical plane relative to each other. When the tractor is in operation, particularly in agricultural work, obstacles, as for example, boulders, roots of trees, etc., are frequently encountered by one edge of the tread. These obstacles tend to pivot each tread block about the supporting wheel therefor, so that strain is placed upon the hinged connection,—the greatest strain being imposed upon the block in immediate contact with the obstacle. Frequently, the strain becomes so great that the block is fractured or the hinged connection broken.

An object of our invention is the provision of means for connecting adjacent tread blocks for use in an endless tread, whereby one or more sections may be pivoted about the supporting wheel therefor, without subjecting any of the blocks to excessive torsional strain.

Another object is the provision of connecting means between the adjacent sections for permitting such sections to be readily assembled, and to be securely held in alignment.

Other objects include the provision of means for enabling the tractor tread to be adapted for use on either soft ground or hard pavement, and for providing an effective gripping contact therewith.

In accomplishing the above objects, we employ a tread having an arcuate trackway on the interior portion thereof, which trackway is adapted to be engaged by supporting wheels, and we employ a ball and socket connection aligned with the axis of such arcuate portion for linking adjacent sections of the tread. Furthermore, we provide yielding members on the gripping surface of each section, which members are adapted to sink into soft ground, or move inwardly to permit the tread to travel over hard ground.

The means for accomplishing the above objects will be more fully explained in the following description, which relates to the drawings, and the essential characteristics will be set forth in the claims.

Figure 4:
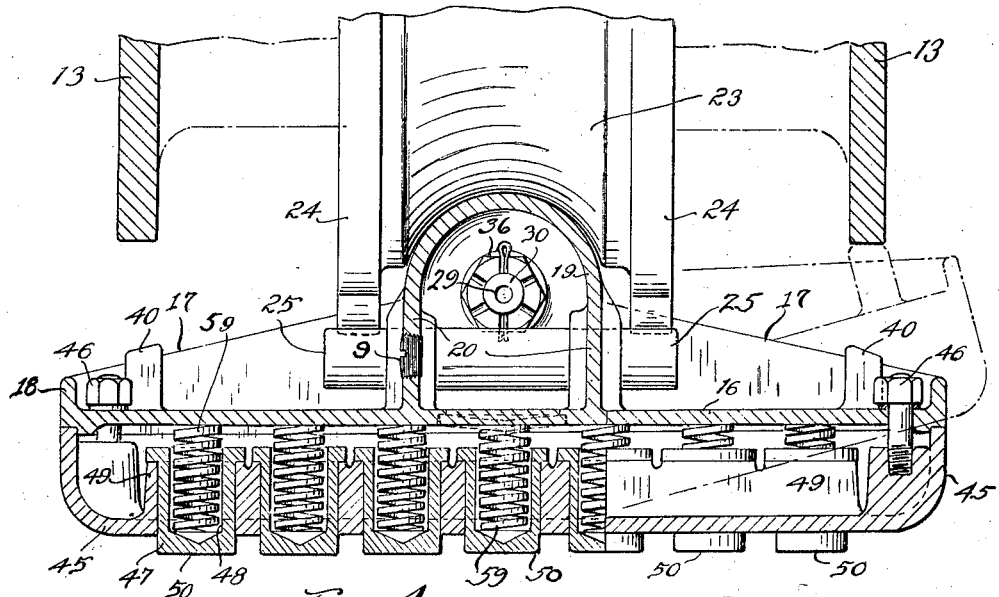
Figure 3:
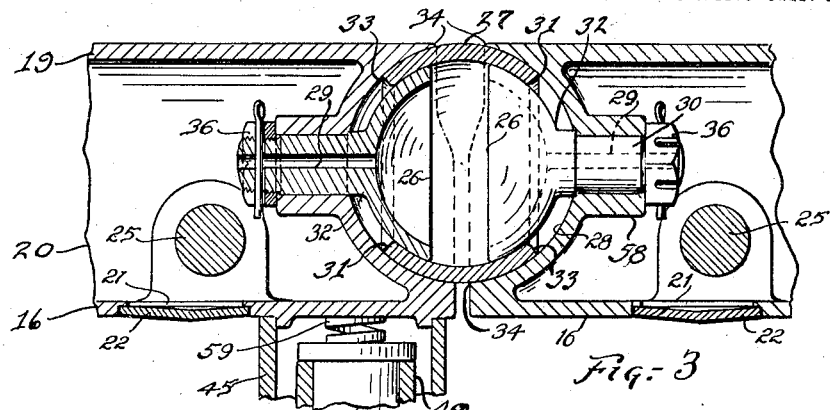
Figure 2:
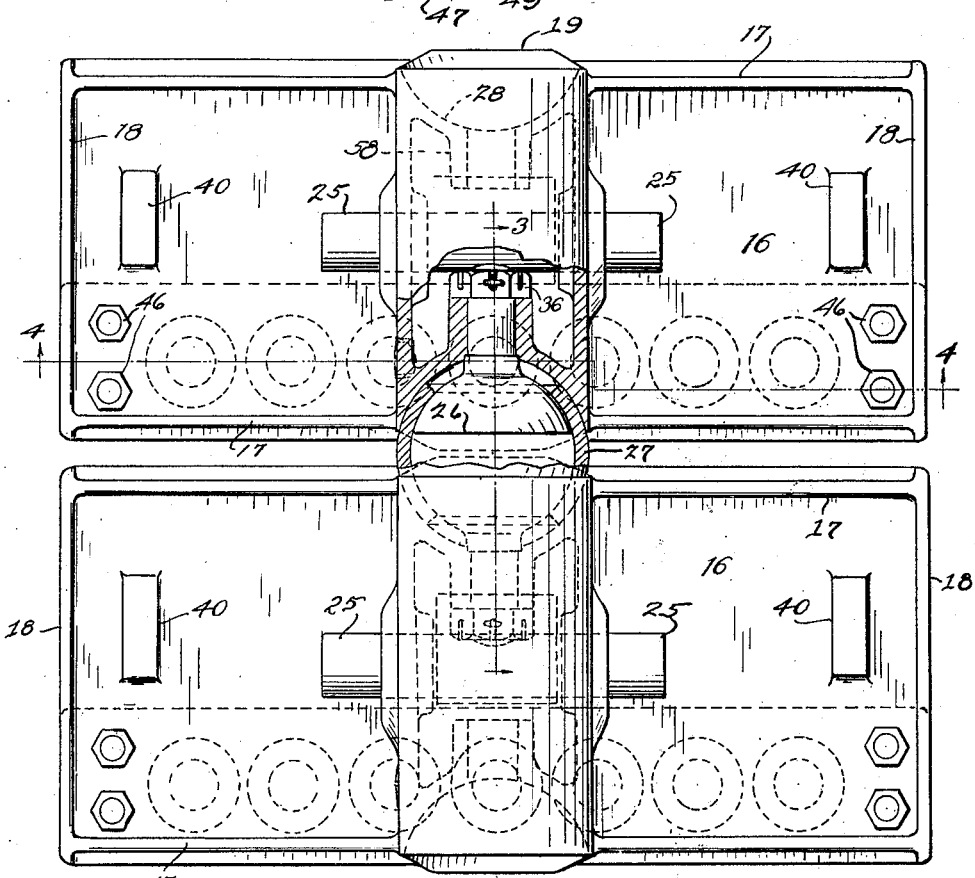

In the drawings, Fig. 1 is a fragmentary elevation, partly in section, of an endless tread embodying the features of our invention; Fig. 2 is a plan, partly in section, of two sections secured together by a ball and socket connection; Fig. 3 is a vertical section taken on the line 3—3 of Fig. 2; Fig. 4 is a transverse section taken on the line 4—4 of Fig. 2.

Our invention contemplates in general the construction of a connection adapted for linking adjacent sections in an endless tread belt, and for providing universal movement between such sections. Accordingly we have shown our device as embodied in a tractor tread, a portion of which is shown in Fig. 1. This tread is adapted to be driven by a sprocket wheel 10, which is journaled at 11 in the frame 12. The sprocket wheel may be driven by means not shown, which means may be connected with the motor in any convenient manner. It is to be understood that the tractor is equipped with a frame and tread on each side thereof, but for purposes of illustration, our invention will be described as pertaining to a single tread.

The frame 12, as shown in Fig. 4, is provided with an apron 13, which extends downwardly and terminates near the lowermost portion of the sprocket wheel 10. The apron constitutes the supporting means for the shafts 14 on which the track engaging wheels 15 are mounted. The uppermost portion of the frame serves to support the idle tread sections, while the lowermost portion constitutes an abutting rail against which the tread sections are adapted to abut, to limit the rotative movement thereof. A more thorough description of the use of these rails will be hereinafter set forth.

Each section comprises a tread plate 16, which is preferably a casting, substantially rectangular in form, and having longitudinal ribs 17, and transverse ribs 18, extending along the marginal edges thereof. Positioned across the middle portion of the plate, and protruding upwardly therefrom, we provide a track comprising an arcuate wall 19, which merges with vertical walls 20 and constitutes an integral part of the casting. The interior of the trackway is preferably hollow, and we provide access thereto by means of an aperture 21. To close such aperture, we employ a removable plate 22, which may be pressed into engagement with the plate 16.

The arcuate portion of the trackway is adapted to be engaged by a complementary arcuate portion 23 on the periphery of the sprocket wheel 10, and on each supporting wheel 15. To engage the sections for moving the tread, we provide teeth which are in the edge flanges 24, on each side of the sprocket wheel. These teeth are adapted to engage the ends of a rod 25, which may extend through and protrude equally from each side of the trackway. We prefer to position each rod 25 on the longitudinal axis of each plate to permit an equal distribution of forces in the universal joints.

To connect adjacent sections, we provide a universal joint which, as shown in Fig. 3, may comprise two bell-shaped members 26, and an annular housing ring 27, which is adapted to move within a spherical recess 28. To provide such spherical recess, the ends of the trackway on each section are recessed inwardly in such manner that the axis of the recess is coincident with the axis of the trackway. The innermost portion of each recess is shown as terminating in a hub 58 within which, the shanks 30 of the bell-shaped members 26 are rotatably supported. Each bell-shaped member comprises a hollow member having an exterior surface which is complementary to the interior periphery of the annular member 27. The width of the annular member is such that one side thereof, as at 31, may engage the neck of the bell-shaped member 26, as at 32, without permitting the opposite edge, as at 33, to uncover the ends of the trackway as at 34.

To assemble the ball and socket connection, the annular ring may be formed into the shape of a cylinder, and the bell-shaped members may be inserted therein, whereupon the walls of the ring may be pressed into engagement therewith. The protruding shanks 30 may then be rotatably secured within the hub 58 by the nut and pin connection 36, whereupon one tread section may be moved universally with relation to an adjacent section. To secure the nut and pin to the shank, access thereto may be had through the aperture 21.

It will be seen that the universal joint, being pivoted at the center of the arcuate portion 19, provides for rotative movement of the tread plate about the axis of the trackway, while the construction of the ball and socket joint, permits movement of each section in a plane, parallel to the sprocket wheel 10. To limit the rotative movement of each section about the above mentioned axis, we provide projecting lugs 40, which may be positioned on the plate 16, so as to engage the bottom of the apron 13.

Referring now to Fig. 1, and assuming that the sprocket wheel is rotating in the direction indicated by the arrow, then each section will be engaged by the sprocket teeth, until it reaches the point where the lug 40 is directly beneath the foremost portion of the plate, as at 41. In the event that an obstacle is encountered, while the section is adjacent the lower portion of the sprocket wheel, it will be seen that the rail on the apron will provide for contact with such lug, and that the strains exerted upon each section will be immediately transmitted to the frame.

To provide for lubrication of the universal joint, each shank 30 may be constructed with an aperture 29, which connects the interior portion of the bell-shaped member, with the interior portion of the trackway on the plate 16. Lubricant of a moderately heavy consistency may then be packed into the hollow portion of a trackway through an aperture in the wall thereof, and such aperture may be thereafter sealed by the plug 9. As the tread passes around the sprocket wheel, the lubricant works through the opening 29 and then outwardly and across the contact surfaces between the bell-shaped member and the housing, and between the housing and the bearing surface on the recess 28.

Extending downwardly from the lower surface of the plate 16, we provide a grouser which is preferably offset from the longitudinal center of each section and comprises, as shown in Fig. 4, a substantially rectangular housing 45, which may be secured in any convenient manner to the plate, as by a bolt and nut connection 46. Assuming that the sprocket wheel is rotated as above indicated, then the grouser on each section will be the first portion of the section to strike the ground, and take up the shock occasioned thereby.

To provide a cushioning effect suitable for use on hard ground, such as pavement, we prefer to employ a series of yielding members which may be carried by the grouser in any convenient manner. We have shown, however, a series of cylindrical members 47, each having an aperture extending partially therethrough, as at 48, and having a peripheral flange extending around the open end of the member. The flange is adapted to abut the top of a rib 49, within the grouser, and to be limited in that direction by contact therewith.

To provide a yielding connection between each member 47 and the tread plate 16, we employ a helical spring 59, one end of which is adapted to abut the bottom of the plate and the other end of which is adapted to abut the member 47 on the innermost portion of the recess therein. These yieldable members are normally held in abutting engagement with the rib 49, in which position a portion thereof, as at 50, is adapted to protrude beyond the bottom of the grouser. When the tractor tread moves over soft ground the tension in each spring is sufficient to cause each point 50 to sink into the ground. On pavement, however, it may be advisable to cap the bottom of each yieldable member with pliable material, such as rubber, whereby an effective gripping action is readily obtained.

In operation, assuming that the sprocket wheel is turning in the direction as indicated by the arrow in Fig. 1, then each section is moved relative to an adjacent section, and in a plane parallel to the axis of rotation of such sprocket wheel, by turning action in the ball and socket connection. Such action is, of course, accomplished by the bell-shaped member 26, rotating within the annular housing 27, or by the annular housing itself rotating within the recess 28 on each section. As each section approaches the ground, the first point thereof to come in contact with the ground is the top of the grouser 45, which takes up the shock on an area which is small in comparison to the area of the section or tread plate 16. If the character of the ground is moderately soft, but still strong enough to prevent the grouser from sinking into the earth, then the nose 50, of each yielding member 47, is designed to sink into the ground and to provide an effective contact medium therewith. Should the character of the soil be such that the grousers will sink therein, then the weight of the tractor is adapted to be carried by the surface of the base plate 16. On hard ground, however, the members 47 are forced upwardly against the tension in the springs 59, whereby a cushioning effect is secured.

In the event that an obstacle is encountered by the side of the tread, then each section, as it passes over such obstacle, is pivoted about the axis of the ball and socket joint, and the tread is free to rotate about such joint without producing a torsional strain thereon. The upward movement of each tread is limited, however, by the rails which extend from one end of the tractor tread to the other end thereof, and which constitute a part of the frame 12.

From the foregoing description, it will be seen that we have provided a tread particularly adapted for use in connection with track-laying vehicles, and that we have provided a universal joint connection between adjacent sections of the tread, whereby each tread is free to rotate about the axis thereof, and torsional strains on the connecting joint are eliminated. Furthermore, our invention effects a tread which enables a tractor to be efficiently operated on any character of soil, and in addition provides a cushioning means which is very useful when the tractor is being driven over hard road beds or pavements.

Having thus described our invention, we claim:—

1. In a device of the class described the combination with tread blocks, each having substantially hemispherical cavities therein, of an articulated sphere between adjacent blocks and seating in said cavities.

2. In a device of the class described, the combination with tread blocks each having outwardly facing cavities therein, of an articulated sphere between adjacent blocks, and seating in said cavities, and means within each of said blocks for securing the articulated sphere thereto.

3. In a device of the class described the combination with a plurality of tread blocks, each of said blocks having an outwardly facing cavity therein, and each cavity being so positioned that when one block is positioned adjacent another, the cavities form substantially a sphere, and universal joints seated in said cavities.

4. In combination, a pair of sprocket wheels, a frame extending therebetween and having an apron projecting downwardly on each side of the wheels, tread blocks supported by the frame, each of said blocks comprising a plate, an arcuate trackway mounted on the plate, means for enabling said plate to be oscillated about the axis of said trackway, and lugs carried by the plate and adapted to engage said apron to limit the oscillation of said plate.

5. In combination, a series of tread blocks comprising an endless belt, each of said blocks having substantially hemispherical cavities therein and so arranged that the cavity in one block faces the cavity in the adjacent block, a universal joint between adjacent blocks, said joint comprising an articulated sphere seated in the cavities and trunnions beyond the innermost portion of said cavities.

6. In combination, a tread plate, a grouser comprising a hollow member extending downwardly from said plate, a series of aligned openings within said grouser, cup-shaped members slidably mounted within said openings and adapted to project beyond the grouser, each of said members having a flange portion for limiting the outward movement thereof and yielding means between said members and plate.

7. In combination, a tread plate comprising a rectangular, substantially flat member, a grouser extending along one edge of said plate and projecting outwardly therefrom, a series of cup-shaped members slidably mounted in said grouser, and adapted to project a slight distance therebeyond, each of said members having an annular flange which is adapted to abut the grouser to limit its movement in one direction, and a series of individual springs each having one end thereof within one of said members, and having the other end thereof in abutting engagement with said plate.

8. In combination, tread blocks, each comprising a hollow reservoir for lubricant, and a hollow universal joint between adjacent blocks, each of said joints having a passageway therethrough for providing communication between the interior of said blocks and the interior of said joints.

9. An endless belt having in combination, tread blocks each having a hollow reservoir therein, hollow universal joints intermediate adjacent blocks, and a passageway for permitting lubricant to flow from said blocks through said joints and into the adjacent block.

10. An endless belt, having in combination tread blocks, each of said blocks having a hollow portion therein adapted to retain a quantity of lubricant, a universal joint connecting adjacent blocks, the interior of each of said joints being hollow, and a passageway connecting the interior portion of each joint with the hollow portion of said block.

11. An endless belt having in combination tread blocks, a hollow trackway carried by each block, a universal joint intermediate the blocks, said joint comprising spherical segments and a zone of a sphere surrounding said segments, each of said spherical segments being provided with a tubular passageway, which provides communication between the interior of the trackway and the interior portion of the joint.

12. An endless tread having in combination, a series of substantially flat tread blocks, a hollow trackway on each block, universal joints connecting adjacent trackways, each of said joints comprising spherical segments, and a zone of a sphere embracing said segments, and means within said trackways for securing said joints thereto.

13. An endless tread comprising substantially flat tread blocks each having a hollow trackway transversely thereof, universal joints intermediate adjacent blocks, each of said joints comprising oppositely disposed hollow spherical segments, a zone of a sphere embracing said segments, trunnions carried by and adapted to support said segments, and removable members within the trackway for securing said trunnions thereto.

14. In combination, tread blocks, a boss thereon having substantially hemispherical cavities therein, there being one boss on each of said blocks, a universal joint intermediate adjacent blocks, and seating in said cavities and having trunnions rotatably mounted within said bosses.

15. In combination, tread blocks, a boss thereon having substantially hemispherical cavities therein, there being one boss on each of said blocks, a universal joint intermediate adjacent blocks, said joint comprising a zone of a sphere free to move within the cavities, and two spherical segments freely movable within said zone, and means comprising trunnions for rotatably supporting said segments within said bosses.

16. In combination, tread blocks, a boss extending transversely of each block and having a hemispherical cavity at each end thereof, two oppositely disposed spherical segments, a zone of a sphere intermediate the segments, and said cavities, said segments being provided with trunnions which are rotatably mounted within said bosses.

In testimony whereof, we hereunto affix our signatures.

CAREL T. TORRESEN.
CHARLES G. ROTH.